(12) United States Patent
Kung

(10) Patent No.: US 8,707,250 B2
(45) Date of Patent: Apr. 22, 2014

(54) AUTOMATION SUPPORT FOR DOMAIN MODELING

(75) Inventor: David C. Kung, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 453 days.

(21) Appl. No.: 12/976,114

(22) Filed: Dec. 22, 2010

(65) Prior Publication Data

US 2011/0154288 A1 Jun. 23, 2011

Related U.S. Application Data

(60) Provisional application No. 61/289,078, filed on Dec. 22, 2009.

(51) Int. Cl.
G06F 9/44 (2006.01)

(52) U.S. Cl.
USPC .............................. 717/105; 108/109; 108/116

(58) Field of Classification Search
None
See application file for complete search history.

(56) References Cited

U.S. PATENT DOCUMENTS

| | | | | |
|---|---|---|---|---|
| 5,838,973 | A * | 11/1998 | Carpenter-Smith et al. | 717/105 |
| 5,907,706 | A * | 5/1999 | Brodsky et al. | 717/105 |
| 6,167,564 | A * | 12/2000 | Fontana et al. | 717/104 |
| 7,162,708 | B2 * | 1/2007 | Cho et al. | 717/104 |
| 7,334,216 | B2 * | 2/2008 | Molina-Moreno et al. | 717/109 |
| 7,644,390 | B2 * | 1/2010 | Khodabandehloo et al. | 717/105 |
| 7,681,176 | B2 * | 3/2010 | Wills et al. | 717/109 |
| 7,694,272 | B2 * | 4/2010 | Bronicki et al. | 717/109 |
| 7,721,252 | B2 * | 5/2010 | Choi et al. | 717/104 |
| 7,797,673 | B2 * | 9/2010 | Szpak | 717/105 |
| 7,849,439 | B2 * | 12/2010 | Green | 717/105 |
| 7,904,876 | B1 * | 3/2011 | Critz | 717/104 |
| 7,941,438 | B2 * | 5/2011 | Molina-Moreno et al. | 707/756 |
| 7,975,254 | B2 * | 7/2011 | Gilboa | 717/117 |
| 8,037,449 | B2 * | 10/2011 | Iborra et al. | 717/105 |
| 8,051,404 | B2 * | 11/2011 | McGovern et al. | 717/109 |
| 8,176,470 | B2 * | 5/2012 | Klumpp et al. | 717/109 |
| 8,291,378 | B2 * | 10/2012 | Arnold et al. | 717/120 |
| 2002/0091990 | A1 * | 7/2002 | Little et al. | 717/105 |
| 2002/0100014 | A1 * | 7/2002 | Iborra et al. | 717/104 |
| 2003/0167455 | A1 * | 9/2003 | Iborra et al. | 717/105 |
| 2004/0015819 | A1 * | 1/2004 | Romano-Critchley et al. | 717/102 |
| 2004/0153992 | A1 * | 8/2004 | Molina-Moreno et al. | 717/105 |
| 2006/0136864 | A1 * | 6/2006 | Choi et al. | 717/104 |

(Continued)

OTHER PUBLICATIONS

Park et al., Agent-Oriented Software Modeling with UML Approach, publisded by IEICE Trans. Inf. & Syst., vol. E83-D, No. 8, Aug. 2000, pp. 1631-1641.*

(Continued)

*Primary Examiner* — Tuan Q. Dam
*Assistant Examiner* — Zheng Wei
(74) *Attorney, Agent, or Firm* — Fisher Broyles LLP; Richard M Lehrer

(57) ABSTRACT

A domain model generator (DMG) for an integrated development environment (IDE) guides a software engineer through a process of identifying domain-specific concepts for a domain of an object-oriented software application. The DMG also helps the engineer to classify the domain-specific concepts as pertaining to particular object-oriented modeling concepts for the object-oriented software application. Those modeling concepts may include classes, attributes, inheritance, etc. In addition, the DMG may automatically generate a Unified Modeling Language (UML) domain diagram, based at least in part on the domain-specific concepts and the corresponding modeling concepts. Other embodiments are described and claimed.

20 Claims, 8 Drawing Sheets

(56) References Cited

U.S. PATENT DOCUMENTS

| | | |
|---|---|---|
| 2006/0168558 A1* | 7/2006 | de Seabra e Melo et al. 717/105 |
| 2006/0288326 A1* | 12/2006 | Raymond et al. ............. 717/100 |
| 2008/0040704 A1* | 2/2008 | Khodabandehloo et al. . 717/105 |
| 2008/0209391 A1* | 8/2008 | Iborra et al. .................. 717/105 |
| 2008/0270977 A1* | 10/2008 | Nucci et al. .................. 717/105 |
| 2009/0007062 A1* | 1/2009 | Gilboa .......................... 717/105 |
| 2009/0083697 A1* | 3/2009 | Zhang et al. ................. 717/105 |
| 2009/0158245 A1* | 6/2009 | Brown et al. ................. 717/105 |
| 2009/0288068 A1* | 11/2009 | Gunsel et al. ................ 717/116 |
| 2010/0005445 A1* | 1/2010 | Argue et al. ................. 717/105 |
| 2010/0325605 A1* | 12/2010 | Ding et al. .................... 717/105 |
| 2010/0325606 A1* | 12/2010 | Sundararajan et al. ....... 717/105 |
| 2011/0099532 A1* | 4/2011 | Coldicott et al. ............. 717/105 |
| 2012/0192146 A1* | 7/2012 | Arnold et al. ................ 717/105 |

OTHER PUBLICATIONS

Silva et al., A UML-Based Design Environment for Interactive Application, publihsed by IEEE 2001, pp. 60-71.*

Kung et al., Object-Oriented Real Time Systems Modeling and Verification, published by IEEE, 1997, pp. 224-231.*

* cited by examiner

```
              Classification Codes (A):     attribute (of a class)
(AC):    association class (of an association)
(AG):    aggregation
(AS):    association
(C):     class, may be a subclass of another class
(I):     inheritance relationship
(m,n):   multiplicity of each class in a binary association
(r1,r2): role name of each class in a binary association
(V):     attribute value (of an attribute of a class)
```

| Rule # | Attribute | Modeling Concept |
|---|---|---|
| 1 | noun/noun phrase | |
| | (a) has independent existence | class |
| | (b) a role played by some object | role in association |
| | (c) describes an association | association class |
| | (d) is generalization/specialization of | superclass / subclass |
| | (e) does not exist independently in application/domain | attribute of some class |
| 2 | "X of Y" expression | |
| | (a) X exists independently in application/domain | Y is an aggregation of X |
| | (b) X does not exist independently in application/domain | X is an attribute of Y |
| | (c) X denotes a role played by some object | X is a role in an association |
| 3 | transitive verb | association relationship |
| 4 | adjective / adverb / enumeration | attribute value |
| 5 | numeric | |
| | (a) relevant concept is an attribute | attribute value |
| | (b) relevant concept is an object | multiplicity |
| 6 | possession expression (e.g., Y has/have/possesses X, etc.) | |
| | (a) X has independent existence in application/domain | Y is an aggregation of X |
| | (b) otherwise | X is an attribute of Y |
| 7 | "consist of/part of/is composed of" expression | aggregation relationship |
| 8 | containment / containing expression | |
| | (a) contained object(s) can be removed without affecting integrity of containing object | association |
| | (b) otherwise | aggregation |
| 9 | "X is Y" or generalization/specialization expression | inheritance |

FIG. 3

| Brainstorming List | Classification Result | Rule # |
|---|---|---|
| undergraduate student[1] | (C) Undergraduate Student | 1 (a) |
| graduate student[1] | (C) Graduate Student | 1 (a) |
| apply to[3] | (AS) apply to (Student, Exchange Program) | 3 |
| no more than two[5] | (1, 0..2) | 5 |
| exchange programs[1] | (C) Exchange Programs | 1 (a) |
| program name[1] | (A) program name | 1 (e) |
| program type[1] | (A) program type | 1 (e) |
| academic department[1] | (A) academic department | 1 (e) |
| academic subject[1] | (A) academic subject | 1 (e) |
| country[1] | (A) country | 1 (e) |
| region[1] | (A) region | 1 (e) |
| term of study[1] | (A) term of study | 1 (e) |
| language[1] | (A) language | 1 (e) |
| semester[1] | (A) Semester // same as term of study | 1 (e) |
| application[1] | (AC) Application (of apply to) | 1 (c) |
| consists of[7] | (AG) Part-of (Application Form, Application) | 7 |
|  | (AG) Part-of (Faculty Recommendation Letter, Application) | 7 |
| two[5] | (2, 1) | 5 |
|  | (AG) Part-of (Course Equivalency Form, Application) | 7 |
| application form[1] | (C) Application | 1 (a) |
| faculty[1] | (C) Faculty | 1 (a) |
| faculty recommendation letter[1] | (C) Recommendation Letter | 1 (a) |
| course equivalency form[1] | (C) Course Equivalency Form | 1 (a) |
| approved by[3] | (AS) approved by (Course Equivalency Form, Academic Advisor) | 3 |
| academic advisor[1] | (C) Academic Advisor | 1 (a) |
|  | (C) Student // added |  |
|  | (I) ISA (Undergraduate Student, Student) // added |  |
|  | (I) ISA (Graduate Student, Student) // added |  |
|  | (AS) provide (Faculty, Recommendation Letter) |  |

FIG. 5

| | | | |
|---|---|---|---|
| 3) | patron | submits | call numbers | (to) system |
| 4) | checkout GUI (i.e., system) | sends | call numbers | (to) checkout controller |
| 4.1) | checkout controller | creates | | msg |
| 4.2) | for each document call number | | | |
| 4.2.1) | checkout controller | gets document | call number | database manager |
| 4.2.2) | database manager | returns | document d | checkout controller |
| 4.2.3) | if document exists (d!=null) | | | |
| 4.2.3.1) | checkout controller | checks availability of | | document |
| 4.2.3.2) | if document is available (i.e., d.isAvailable() is true) | | | |
| 4.2.3.2.1) | checkout controller | appends | document detail | (to) msg |
| 4.2.3.3) | else | | | |
| 4.2.3.3.1) | checkout controller | appends | call number " not available" | (to) msg |
| 4.2.4) | else | | | |
| 4.2.4.1) | checkout controller | appends | call number " not found" | (to) msg |
| 4.3) | checkout controller | returns | msg | (to) checkout GUI |
| 4.4) | checkout GUI | displays | msg | (to) Patron |

FIG. 9

AUTOMATION SUPPORT FOR DOMAIN MODELING

CROSS REFERENCE TO RELATED APPLICATIONS

This application claims the benefit of the filing date of U.S. provisional patent application No. 61/289,078, which was filed on Dec. 22, 2009, by the same inventor of this application. That provisional application is hereby incorporated by reference.

FIELD OF THE INVENTION

The present disclosure relates generally to the field of computer programming, and more particularly to methods and related apparatus for automating at least some of the operations associated with object-oriented programming (OOP).

BACKGROUND

A data processing system may include hardware and software resources. The software resources may include tools for developing additional software. For instance, the software development tools may provide for an integrated development environment (IDE). A software developer or engineer or may use the IDE to create a new software system or application to utilize the principles of OOP.

SUMMARY

In one embodiment, an IDE includes an automation support tool (AST) for helping a software engineer to create a domain model or domain object model (DOM) for an object-oriented software application. The AST may include a domain model generator (DMG) with features for guiding the software engineer through a process of identifying domain-specific concepts for the domain of the software application. The DMG may also help the engineer to classify the domain-specific concepts as pertaining to particular object-oriented modeling concepts for the software application. Those modeling concepts may include classes, attributes, inheritance, etc. The resulting collection of domain=specific concepts and modeling concepts may constitute a textual model of the domain. The AST may also include a diagram generator for automatically generating a Unified Modeling Language (UML) class diagram for the domain of the software application, based at least in part on the textual domain model.

Additional embodiments pertain to a corresponding method for guiding the software engineer and a corresponding hardware system for guiding the software engineer. Numerous other embodiments are also possible.

BRIEF DESCRIPTION OF THE DRAWINGS

Features and advantages of the present invention will become apparent from the appended claims, the following detailed description of one or more example embodiments, and the corresponding drawings, in which

FIG. 3 is a chart listing potential attributes of domain-specific concepts and corresponding object-oriented modeling concepts, according to one example embodiment;

FIG. 5 is a table listing selected phrases from a business requirements document and corresponding rules and classification results, according to one example embodiment;

FIG. 9 is an example scenario table.

DETAILED DESCRIPTION OF ONE OR MORE EMBODIMENTS

Figures 1, 4:
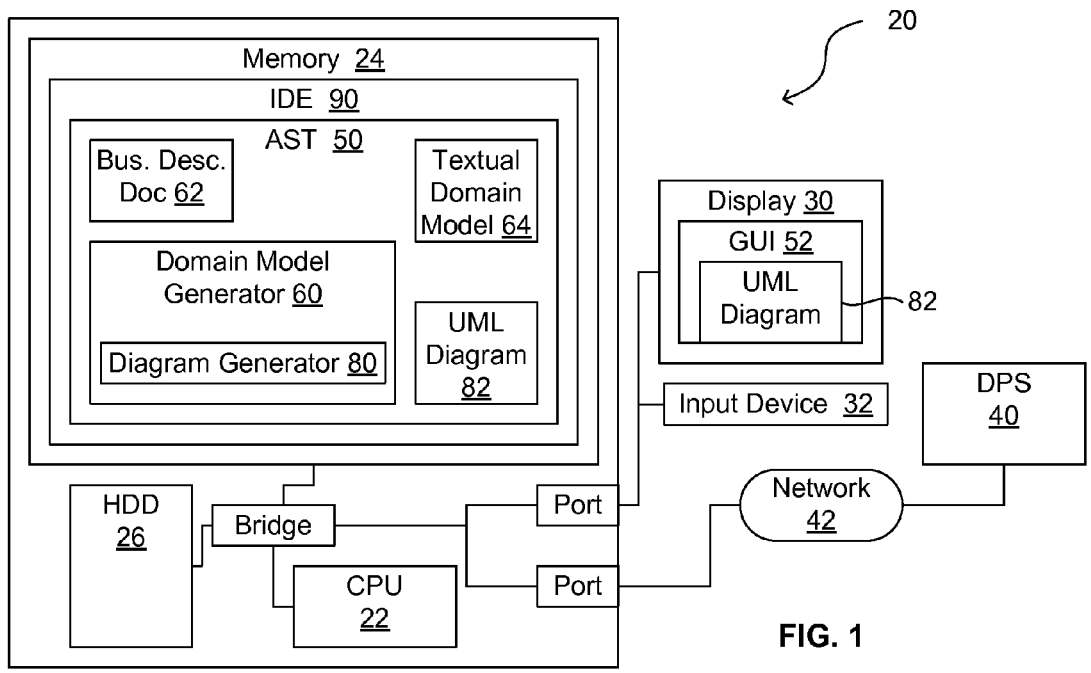
FIG. 1 is a block diagram of an example embodiment of a data processing environment with an IDE featuring an AST.
FIG. 4 is a table listing object-oriented modeling concepts and corresponding abbreviations.

The objects in the drawings are not necessarily drawn to scale, and certain features may be shown exaggerated in scale or in somewhat generalized or schematic form in the interest of clarity and conciseness. The same reference numerals may be used in different figures to identify the same or similar parts.

As used herein, terms such as "processing system," "data processing system," and "data processing machine" are intended to broadly encompass a single machine, or a system of communicatively coupled machines or devices operating together. Example processing systems include, without limitation, distributed computing systems, supercomputers, high-performance computing systems, computing clusters, client-server systems, mainframe computers, mini-computers, workstations, servers, personal computers, portable computers, laptop computers, tablets, handheld devices, and other platforms or devices for processing or transmitting information.

FIG. 1 is a block diagram depicting a suitable data processing environment in which certain aspects of an example embodiment of the present invention may be implemented. The data processing environment includes a data processing machine or data processing system 20 with various hardware resources or components. Those components may include a central processing unit (CPU) 22, volatile data storage devices such as random access memory (RAM) 24, and non-volatile data storage devices such as read-only memory (ROM), a hard disk drive (HDD) 26, and other devices or media, such as floppy disks, optical storage, tapes, flash memory, memory sticks, digital video disks, etc. Data processing system 20 may also include various input/output (I/O) ports, a display 30, one or more input devices 32 (such as a keyboard and a pointing device), etc. In addition, data processing system 20 may communicate with one or more remote data processing systems 40 via a network 42, such as a local area network (LAN), a wide area network (WAN), an intranet, the Internet, etc.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For instance, programs and/or other data may be copied from a HDD 26 into RAM 24 for execution, output may be copied from RAM 24 to a non-volatile storage device or to an output device, etc.

For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations. Programs may generate user interfaces for use by software engineers or other human users. Any suitable techniques may be used to interact with such user interfaces. For instance, a pointing device may be used to move a pointer to desired locations and conventional click-and-drag techniques may be used to highlight or select particular phrases or objects, to interact with pop-up menus, etc.

Object-oriented programming refers to a programming framework or paradigm that uses "objects" to design computer programs and applications. An object may relate to a particular real-world concept, such as a product, a product manufacturer, a customer, etc. An object may be implemented as a variable that comprises both data and associated routines or "methods," with the variable nevertheless treated as a discrete entity. An object-oriented application may be created to provide data processing services for a particular field of use or domain.

Two of the intellectual activities associated with creating a software application are (1) development of analysis and design ideas and (2) visualizing the ideas by drawing diagrams or models to document and communicate the ideas. This disclosure describes a software development tool that helps the software engineer to effectively develop and organize the analysis and design ideas. This software development tool may also be used to automatically draw models to document and communicate those ideas. For purposes of this document, this tool may be referred to as an automation support tool (AST).

The embodiment of FIG. 1 depicts an example IDE 90 that includes an example AST 50. AST 50 may enable a novice software engineer to conduct object-oriented analysis and design in an individual or teamwork environment and produce quality software. AST 50 may be used to guide the software engineer through the design process step by step, guiding and supporting the thinking process of the engineer. Consequently, AST 50 may produce the design artifacts or elements identified in the analysis process, with those elements represented in a desired format. For instance, the engineer may use AST 50 to create a textual domain model. AST 50 may then automatically convert the design elements into one or more UML class diagrams. Consequently, the software engineer is not required to draw the diagrams.

In some embodiments, the AST may work more or less independently of any other software design tools. In other embodiments, the AST may work with or be incorporated into an existing IDE or other existing tools. For example, the AST may work with or be incorporated into the product distributed by IBM under the trademark Rational Rose Modeler, the product distributed by Microsoft under the trademark Visio Studio, etc.

In the example embodiment of FIG. 1, AST 50 includes a DMG 60 and a diagram generator 80. As explained in greater detail below, a software engineer may use DMG 60 to generate a textual domain model 64 for an object-oriented software application. In addition, the software engineer may use the diagram generator to automatically generate a UML class diagram 82 based on textual domain model 64. AST 50 may enable automatic validation and verification of the products of the engineers thought process.

The functionality described herein may be used or adapted for plan-driven or agile development. In addition, the described functionality may be provided as part of a tool that supports additional parts of the software development process. For instance, an AST may provide automation support for the following five steps:

Step 1. Deriving Use Cases from Requirements.

In this step, engineers may use AST 50 to derive use cases from the business requirements. Each use case may represent a business process.

Step 2. Domain Modeling.

In this step, engineers may use AST 50 to generate a domain model which visually displays important domain concepts, their properties, and relationships between the domain concepts. Domain modeling helps the engineers understand the application domain and communicate their understanding.

Step 3. Actor-System Interaction Modeling.

In this step, engineers may use AST 50 to describe how the user interacts with the software application or system to carry out the business processes or use cases. This deals with the front-end processing of the use cases.

Step 4. Object Interaction Modeling.

In this step, engineers may use AST 50 to specify the interaction among the software objects to carry out background processing of the use cases.

Step 5. Deriving Design Class Diagram.

In this step, engineers may use AST 50 to produce a UML class diagram, called a design class diagram. That diagram may serve as a design blueprint that integrates information in the domain model and sequence diagrams. It may be derived from the domain model produced in Step 2 and sequence diagrams produced in Step 4.

With regard to Step 2, domain modeling, when creating a software application for a particular purpose or business, the software engineers need to know about that business to design and implement the software application. Even if all the engineers of a team are familiar with the business, their knowledge may differ considerably due to differences in individual background and work experiences. The engineers should communicate and share their understanding of the business to develop a common perception upon which to design and implement the software application. For purposes of this disclosure, the term "application domain" may be used to refer to the information about a business that is needed to create an effective software application for that business. A domain model may be used to represent the information describing the application domain.

In general, the process of domain modeling (i.e. generating a domain model) may include the following steps:

Domain Model (DM) Step 1. Collecting Information.

The first step to domain modeling is collecting application domain information. The result of this step may be referred to as a business requirements document or a business description document. Any suitable approach may be used for this step.

DM Step 2. Brainstorming.

The second step is to identify and list important application domain concepts and relationships. For instance, the engineer (or engineers) may explore needed domain knowledge and begin documenting that knowledge. This exploration and documentation may be accomplished by applying a first set of rules. In one embodiment, the first set of rules includes instructions for the engineer to identify all of the phrases in the requirements document that (a) are relevant to the application domain and (b) meet any of the following criteria:

(1) the phrase is a noun or noun phrase;
(2) the phrase is an expression of the form "X of Y" or "Y's X" (e.g., make of car);
(3) the phrase is a transitive verb;
(4) the phrase is an adjective, adverb, or enumeration;
(5) the phrase is a numeric value or an expression of quantity;
(6) the phrase is an expression of possession (e.g., car has wheels);
(7) the phrase expresses a "constituents/part of/consist of" relationship;
(8) the phrase expresses a containing or containment relationship;
(9) the phrase describes a relationship of generalization or specialization (e.g., "X is a Y" or "a graduate student is a student").

Criteria 1-9 may also be referred to as "phrase types 1-9" or simply "PHR 1-PHR 9." In response to the engineer identifying all of the phrases according to the first set of rules, DMG 60 may save the identified phrases as a list of important phrases for the application domain.

Figure 2:
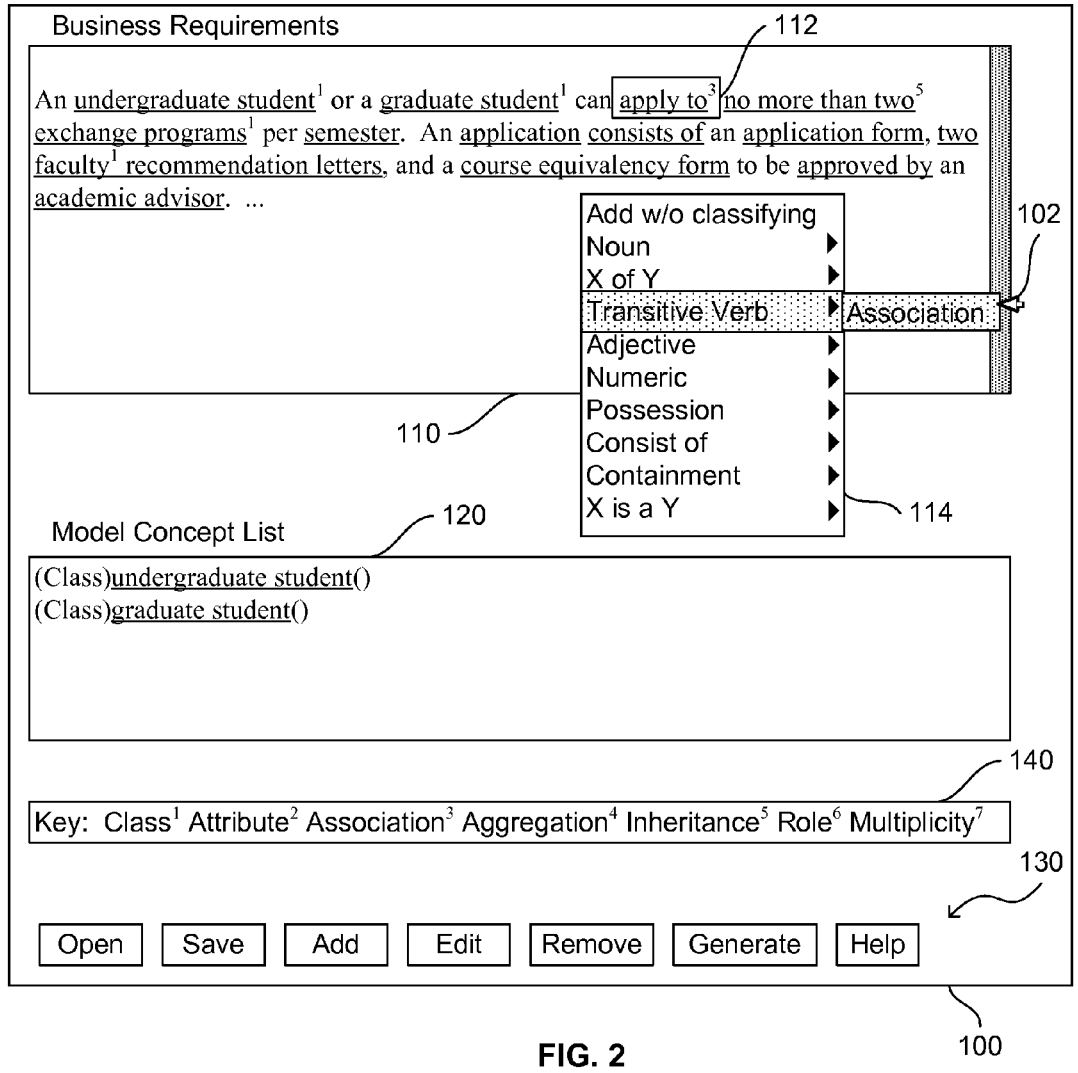
FIG. 2 depicts an example embodiment of a user interface for guiding a software engineer in a process of conceptualizing and identifying domain-specific concepts and corresponding modeling concepts for the domain of an object-oriented software application.

FIG. 2 depicts an example embodiment of a user interface or screen 100 for guiding a software engineer in a process of conceptualizing and identifying domain-specific concepts and corresponding modeling concepts for the domain of an object-oriented software application. DMG 60 may present screen 100 as a window in a graphical user interface (GUI) on display 30. As shown, screen 100 may include a business requirements pane ("requirements pane") 110 and a model concept pane ("concepts pane") 120. In the embodiment of FIG. 2, those panes or windows are text fields. Screen 100 may also include various control buttons 130 and a color coded key 140.

The engineer may use screen 100 after DM Step 1 has been completed and a business description document has been created and saved. The engineer may then open the business description document in requirements pane 110 of DMG 60. For instance, the engineer may (a) select or click a File or Open button, (b) select an "Open Requirements Document" option, (c) locate the file that contains the business description document of interest, and (d) click OK or Open to open the document in requirements pane 110.

The engineer may then highlight specific phrases from the business requirements document to select those phrases as important domain-specific concepts for the software application. The first set of rules may provide guidance for this process. For instance, in response to selection of a help button, DMG 60 may present the first set of rules to the engineer.

In one embodiment, to identify a phrase as important, the engineer uses a pointing device to highlight or select each important phrase in requirements pane 110. After selecting a phrase, the engineer may (a) right click the highlighted/selected phrase to access a pop-up menu 114, and (b) select an available menu option (e.g., "Add w/o classifying") to identify the selected phrase as an important phrase for the application domain, without classifying the phrase as pertaining to any particular type of domain modeling concept. In response, DMG 60 may display each such selected phrase with underlining in requirements pane 110. For example, in FIG. 2, numerous phrases are shown with underlining, to show the phrases that have already been identified as important. DMG 60 may also use highlighting to indicate which phrase is currently being identified or classified.

DM Step 3. Classifying Brainstorming Results.

The third step for data modeling is to classify the brainstorming results (e.g., the selected domain phrases) according to characteristics relevant to objects in the object-oriented programming paradigm. This may be accomplished through use of a second set of rules. For instance, the second set of rules may guide the engineer through the exercise of identifying selected phrases as relevant to object classes, attributes (of object classes), or relationships. The relationships may include generalization/specialization or inheritance, aggregation or whole-part, and association relationships. Thus, in DM Step 3 the engineer further analyzes and documents the knowledge according to the second set of rules. The result of this step may be a domain model that describes the object-oriented characteristics of the selected domain phrases. Different forms may be used to describe, represent, organize, and/or present the domain model. For example, the domain model may be expressed in a primarily textual manner. Alternatively, a variety of files (or other storage constructs) may be used to describe different aspects of the domain model.

In one embodiment, to classify the selected phrases, the engineer uses screen 100 to specify at least one additional characteristic for each of those phrases. For instance, as shown in FIG. 2, the engineer may right click on the phrase "apply to" to access a pop-up menu 114. The engineer may then select an available menu option to classify the selected phrase as pertaining to a particular object-oriented modeling concept. For instance, as shown at block 122, the engineer may use the "Transitive Verb" option to classify the phrase "apply to" as an application domain concept that has the object-oriented modeling characteristic of an "association" relationship. Thus, DMG may present options in pop-up menu 114 which correspond to particular object-oriented modeling concepts.

However, the options in the menu may be easier for an engineer to understand and apply than the corresponding object-oriented modeling concepts. For instance, the options may refer to various potential grammatical characteristics of the phrases, and DMG 60 may map different types of grammatical characteristics to different object-oriented modeling concepts. In addition, for some object-oriented modeling concepts, DMG 60 may map more than one type of grammatical characteristic to a single modeling concept. In addition, pop-up menu 114 may include multiple levels of options, to provide a hierarchy of options to guide the engineer in selecting an appropriate option or characteristic for each phrase.

FIG. 3 is a chart listing potential attributes or characteristics of domain-specific concepts or phrases, along with corresponding object-oriented modeling concepts, according to one example embodiment. These potential attributes (second column) may be used to apply the second set of rules. In the example embodiment of FIG. 2, the second set of rules is implemented as nine options and various sub-options in a series of pop-up menus. For instance, in menu 114, the "noun" option may lead to the five sub-options listed under "Rule #1" in FIG. 3 (i.e., has independent existence, a role played by some object, describes an association, is generalization/specialization of, does not exist independently in application/domain). Thus, the engineer could right click the phrase "undergraduate student," and then select the "Noun" option from pop-up menu 114. Pop-up menu 114 may then present another level of options (or sub-options) listing the attributes that appear under the "noun/noun phrase" rule in FIG. 3. The engineer may then select an option for "has independent existence." In response, DMG 60 may classify "undergraduate student" as a member of the object-oriented modeling concept of "class." Menu 114 may also show the modeling concept associated with each option or sub-option. For example, as shown, the "transitive verb" option connects to the "association" concept.

As another example, in FIG. 3, "X of Y" (rule 2) has three cases. Case (a) leads to "Y is an aggregation of X;" case (b) leads to "X is an attribute of Y;" and case (c) leads to "X is a role in an association." For instance, to classify the phrase "engine of a car" the engineer would utilize case (a), since car is an aggregation of engine, among other components such as brakes, transmission, etc. In other words, an engine is a part of a car. By contrast, to classify the phrase "make of a car," the engineer would use case (b), since make is an attribute of car—make does not have an independent existence in the real world (though the auto manufacturer may have independent existence). Similarly, if a business description document indicates that "an engineer is the designer of a car," the phrase "designer of a car" may be classified by case (c) to identify "designer" as a role of the "engineer" in relation to the car.

Rule 6, possesion expressions, may also lead to aggregation, or to attributes, in case the business description document uses a different format to express the same kinds of facts. For instance, "A car has an engine" leads to aggregation; "a car has make, horsepower, etc." leads to attributes. Another rule that can lead to aggregation is "consist of/part of/is composed of," as in "car consists of engine, brake, etc." Containment applies to a phrase like "basket containing five apples." The apples can be removed without affecting the integrity of the basket. By contrast, an engine cannot be removed without affecting the integrity of the car. The list below provides additional examples of phrases, the applicable rules, and the corresponding modeling concept:

1(d): Vehicle is a generalization of car, therefore Vehicle is a class;
1(d): Boat is a specialization of vehicle, therefore Boat is a class; (also see the description for rule 9 below);
4: High is an adjective, therefore High is an attribute value of some attribute (e.g., values of temperature, values of pressure, etc.);
4: adverb (similar to adjective);
4: a sedan car has Four tires, with Four being a numeric; therefore Four is an attribute value for the number of tires on the car.
9: For "Manager is an employee," employee is a generalization of Manager, and Manager is a specialization of employee; therefore this phrase involves an inheritance relationship between the two (i.e., Manager inherits all properties and relationships of employee).

As has been described, DMG 60 presents the engineer with a list of phrase types, and the engineer then selects one of those types to associate the selected phrase with a corresponding object-oriented modeling concept.

Furthermore, after the engineer has classified a phrase, DMG 60 may then provide a dialog box to allow the engineer to enter additional information pertaining to the object-oriented modeling concept. For instance, after identifying "undergraduate student" as a class, a dialog box may allow the engineer to enter class-related information, such as a name for the class and attributes for the class, such as roles and multiplicity. After identifying "apply to" as an association, the dialog box may allow the engineer to modify the association name, to specify a source class, a source class role, and source class multiplicity. The dialog box may also allow the engineer to specify a destination class, a destination class role, and destination class multiplicity.

After a phrase has been connected with a domain modeling concept, DMG 60 may present the modeling concept in concepts pane 120. For example, after "undergraduate student" and "graduate student" have been classified as classes, DMG 60 may update concepts pane 120 with "(Class)undergraduate student( )" and "(Class)graduate student( )". Similarly, the engineer may proceed to classify "apply to" as a association relationship (via the "transitive verb" option); "no more than two" as an attribute value (via the "adjective/adverb/enumeration" option, or the "numeric—relevant concept is an attribute" option) and "exchange programs" as a class. In response, DMG 60 may add the following lines to concepts pane 120:

(AS)apply to(student, exchange program)
(Class)exchange program(1, 0 . . . 2)

Thus, DMG 60 may use the second rule set to guide the engineer through the process of connecting selected phrases to corresponding modeling concepts.

DMG 60 may also show which phrases in requirements pane 110 have been connected to which modeling concepts. For instance, DMG 60 may present a key 140 with each modeling concept (e.g., Class, Attribute, Association, Aggregation, Inheritance, Role, and Multiplicity) shown in a different color and/or with a different superscript. After the engineer has connected a phrase with a modeling concept, DMG may display that phrase in the corresponding color and/or with the corresponding superscript in requirements pane 110.

The features described above may make it relatively easy for a novice software engineer to derive an accurate domain model from a business description document. The engineer may first identify the important phrases, and may then classify those phrases according to relevant object-oriented modeling concepts. Alternatively, a more advanced engineer may select and classify phrases at the same time. For instance, when identifying a phrase as important, instead of selecting the "add w/o classifying" option, the engineer could select the option that describes how that phrase fits within the second rule set.

FIG. 4 is a table listing object-oriented modeling concepts and corresponding abbreviations or classification codes. DMG 60 may use these or similar codes to indicate or document the classification results.

FIG. 5 is a table listing selected phrases from a business description document, along with corresponding rules and classification results, according to one example embodiment. The left column shows the phrases. The middle column shows the corresponding object-oriented modeling concepts. The right column shows which option from the second set of rules was used to connect each phrase to the corresponding modeling concept. The classes are presented with initial capital letters, and the attributes are shown together with the corresponding classes. For instance, the attributes of the Exchange Program class are listed under that class. In column two, a binary relationship is displayed using the following notation:

relation-name '('source-class-name, destination-class-name')'
['('[source-multiplicity, destination-multiplicity]')']
['('[source-role-name], [destination-role-name]')']

Multiplicity may be expressed using the following forms:
0 . . . 1 for zero or one
0 . . . m for zero to m
*, 0 . . . * for zero or more
1 for exactly one (default)
i, j, k for explicitly enumerated DMG 60 may generate output like that shown in FIG. 5 to document or list the classes, their attributes, and relationships between the classes for the application domain. The classification results may be considered as one form of a textual domain model.

In addition, DMG 60 may guide the engineer with instructions for dealing with missing modeling concepts for the domain. For instance, DMG 60 may instruct the engineer to use the following rules to deal with missing classes.

Generalization rule. If B and C are classes and A is a generalization of B and C, then include A as a superclass of B and C. For example, from Undergraduate Student and Graduate Student, we infer Student as a superclass because a student can apply to an exchange program.

Specialization rule. If A is a class and B is an relevant specialization of A, then include B as a subclass of A. For example, from Student we can infer Undergraduate and Graduate Students if these are application relevant.

Whole-part rule. If A is a class and application/domain knowledge indicates that B is part-of A, then include B as a component class of A. If B is a class and application/domain knowledge indicates that A is an aggregate of B, then include A as an aggregate class of B.

To deal with missing attributes and types, DMG 60 may instruct the engineer as follows:

1. Determine which classes do not have any attributes (which indicates that attributes for these classes are missing and need to be identified).
2. Identify additional attributes and types from business forms (e.g., request forms, invoices, order forms, reservation forms, etc.).

For instance, in concepts pane 120 of FIG. 2, Undergraduate Student and Graduate Student do not have attributes. The missing attributes and types may be obtained from the registration forms.

To deal with missing relationships, DMG 60 may instruct the engineer as follows:

1. Determine which classes are isolated (i.e., not related to any other class).
2. Identify relevant relationships from the business description document or other sources.

For example, the engineer may notice that Faculty is not related to any other class. The engineer may then determine from the description that Faculty provides recommendation letters. Consequently, the engineer may specify an association relationship between the Faculty and Recommendation Letter classes.

To deal with missing multiplicity, DMG 60 may instruct the engineer as follows:

1. Carefully examine each of the association and aggregation relationships for any important multiplicity that is missing (e.g., multiplicity information that specifies domain laws or application specific constraints).
2. Add multiplicity specifications accordingly.

As indicated above, DMG 60 guides the engineer through two different sets of rules for generating a domain model. For instance, as indicated above, the engineer may follow the first set of rules to identify important domain concepts from a business description document. The end result may be a list of selected domain phrases. The engineer may then follow a second set of rules to classify those phrases and document the characteristics needed to form a model of the application domain.

DM Step 4. Visualizing the Domain Model.

The fourth step is to present the classes, attributes, and the various relationships in a visual or graphical manner. For instance, in the embodiment of FIG. 1, diagram generator 80 may produce a UML class diagram 82 that illustrates the classes, attributes, and the various relationships in the domain model. UML diagram 82 may be presented within a GUI 52 on display 30. In addition or alternatively, diagram generator 80 may user other forms of output, such as a printing UML diagram 82 on a printer, saving UML diagram 82 as a file on a flash drive or a hard drive, etc.

Figure 6:
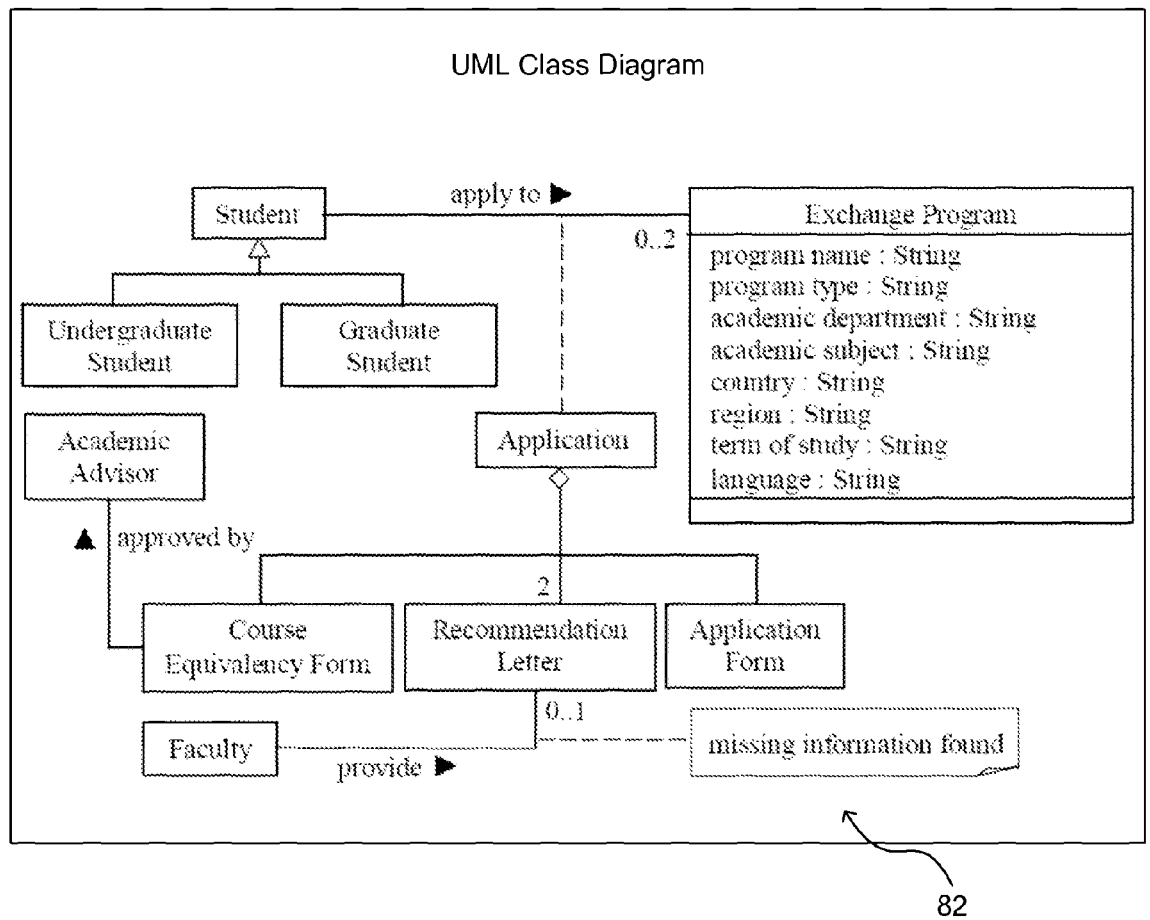
FIG. 6 depicts an example embodiment of a UML class diagram for the domain of an object-oriented software application, as produced by a diagram generator.

FIG. 6 depicts an example embodiment of a domain diagram for an object-oriented software application, as produced by DMG 60. For instance, diagram generator 80 may automatically produce such a diagram in response to the engineer selecting the "generate" button in user interface 100 of FIG. 2. In response to selection of the generate function, diagram generator 80 may translate the classification results from the data modeling operations described above from a textual format to a graphical format.

Figure 7:
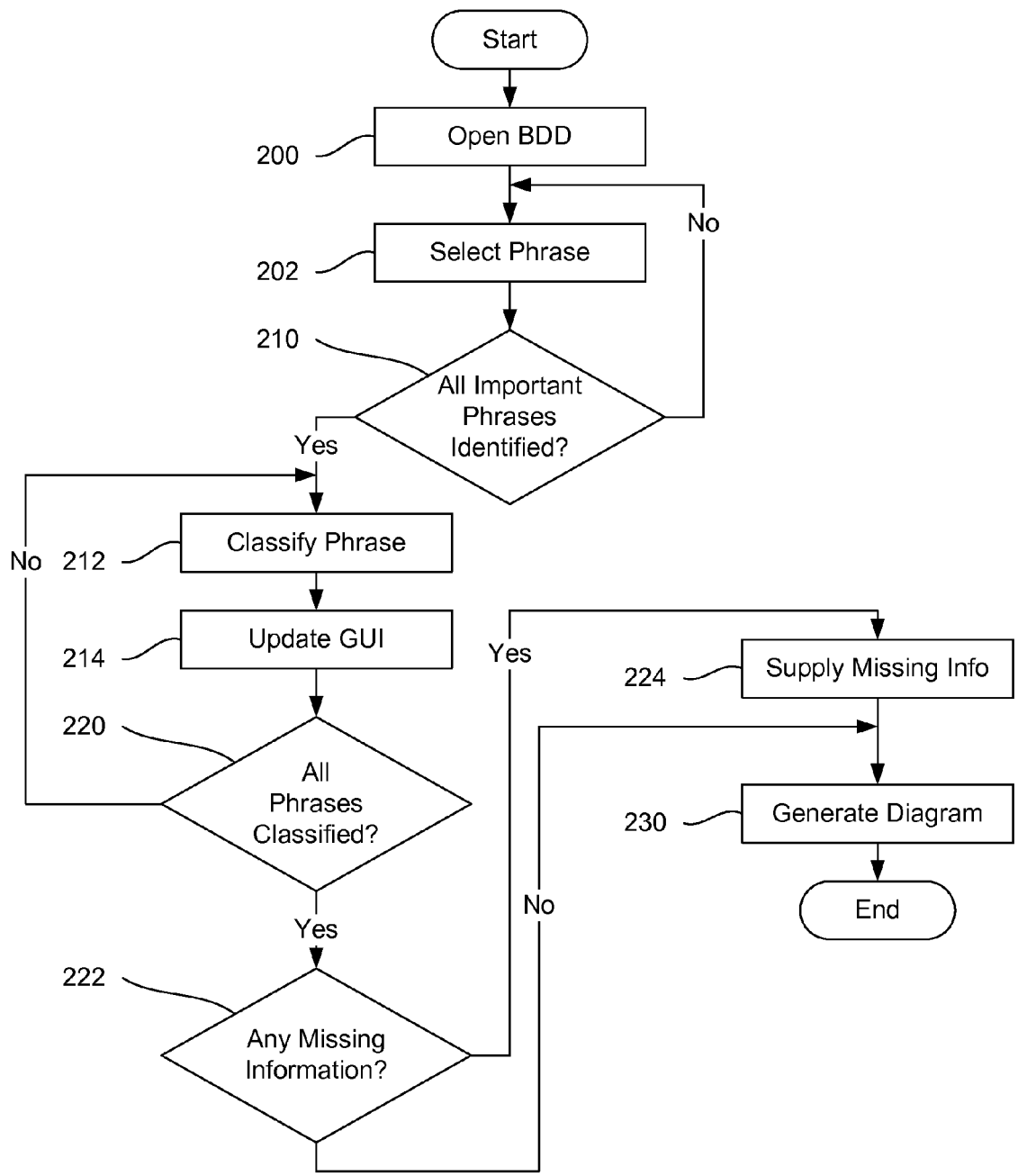
FIG. 7 presents a flowchart of an example embodiment of a process for guiding a software engineer in a process creating a textual domain model and a corresponding domain diagram for an object-oriented software application.

FIG. 7 presents a flowchart of an example embodiment of a process for guiding a software engineer in a process of creating a domain model and a corresponding domain diagram for an object-oriented software application. As indicated at block 200, the process may start with the software engineer opening the business description document in requirements pane 110. As shown at blocks 202 and 210, the engineer may then select each of the important phrases for the application domain from the business description document. As described above, DMG 60 may use a first set of rules to guide the engineer in that process.

As shown at blocks 212 and 220, once the important phrases have been identified, the engineer may then classify each of the phrases, based on a second set of rules. For instance, as described above, DMG 60 may provide a hierarchy of menu options to guide the engineer in the process of connecting phrases to corresponding modeling concepts. As shown at block 214, DMG 60 may update user interface 100 whenever the engineer supplies additional classification information. For instance, as described above, color coding and/or footnotes may be added in requirements pane 110, and object-oriented concepts for the domain may be added to concepts pane 120.

As indicated at blocks 222 and 224, after all of the phrases have been classified, if any important information is missing, DMG 60 may guide the engineer in how to identify the missing information. After the above steps have been completed, DMG 60 may contain a textual model of the application domain. As shown at block 230, the engineer may then select a generate function, and in response DMG 60 may automatically produce a class diagram to illustrate the classification results.

Figure 8:
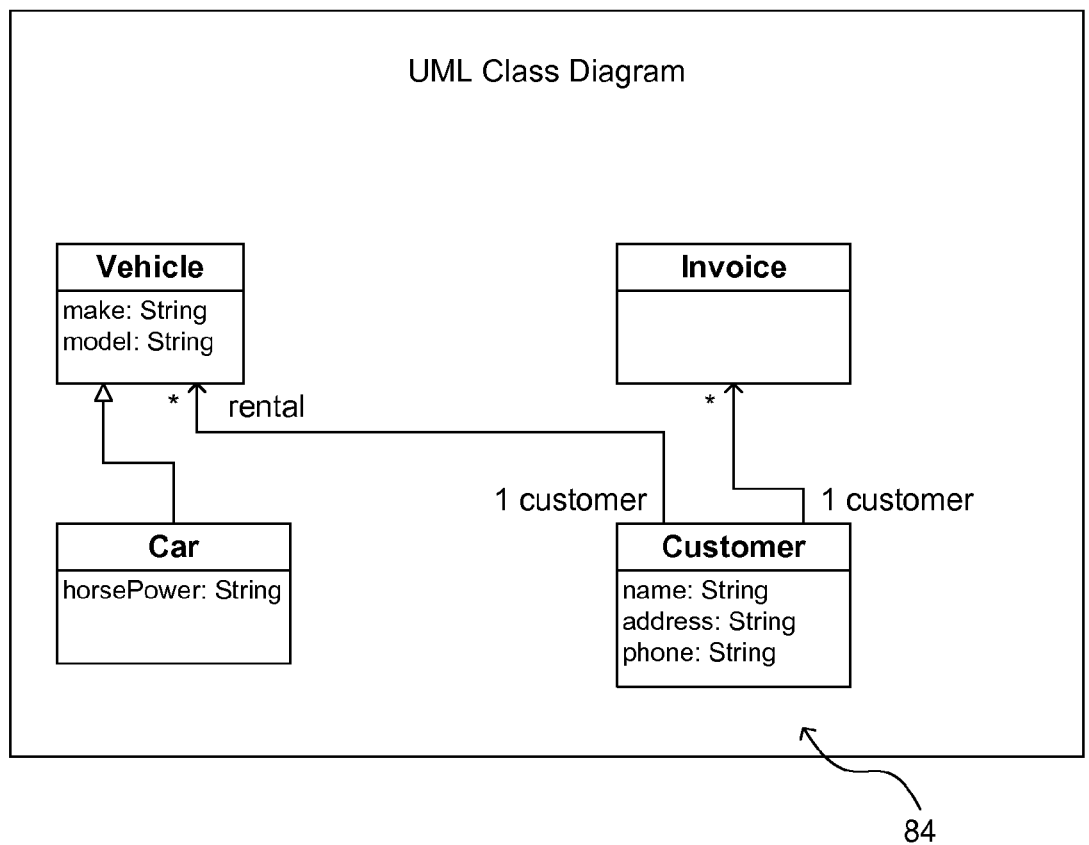
FIG. 8 depicts another example embodiment of a UML class diagram.

FIG. 8 depicts another example of a domain diagram 84 for an object-oriented software application, as may be produced by DMG 60. Diagram 84 illustrates the domain for a software application for a vehicle rental business.

Without the kind of automation support provided by DMG 60, an average developer generally would not have a clear idea which phrases or concepts in a business description document should be chosen as important for the domain of the software application, identify. An average developer also generally would not have a clear idea of how properly to classify important phrases into object-oriented modeling concepts. The actual performance of different developers varies widely. Further, a developer may perform better for an application with which he or she already has significant experience, but may perform poorly for new applications. Without the kind of automation support provided by DMG 60, a developer may go directly to drawing whatever he or she has in mind, using a convention drawing tool. This approach tends to divert the attention of the developer away from the thinking process for recognizing important concepts, relationships, and such, and to draw his or her attention instead towards how to use the drawing tool to draw a nice looking diagram. With DMG 60, the thinking process is separated from the drawing process, with the latter being completely automated, which frees the developer from having to draw the diagram. Manual preparation of diagrams can be very time consuming, considering the time needed to learn how to use the drawing tool in general, as well as the time needed to create the diagram for the current application. Importantly, DMG 60 enables the developer to focus on identifying important concepts or phrases, and DMG 60 helps the developer to classify the phrases into appropriate modeling concepts. Accordingly, DMG 60 may contribute to improved productivity and quality while reducing costs and time to market.

As indicated above, in addition to providing assistance for domain modeling, AST 50 may provide additional features to assist with development of the software application, such as support for actor-system interaction modeling and object interaction modeling.

With regard to actor-system interaction modeling, AST 50 may help the engineer to describe how the end user or actor will interact with the software application or system to carry out the business processes or use cases. The aspects of the system which deal with end user interaction may be referred to as front-end processing of the use cases. In one embodiment, AST 50 guides the engineer to construct a two-column table to specify how an actor interacts with the system to jointly carry out the front-end processing of a use case. The left column of the table shows the input and action of the actor at each step. The right column shows the corresponding system responses. The two-column table may be called an expanded use case.

For example, in an application for lending libraries, the process for checking out a document may have an expanded use case with a left column for "Actor: Patron" and a right column for "System: LB." The first row may have "1) patron clicks the 'Checkout Document' button on the main menu" in the left column, and in the right column "2) The system displays the Checkout" menu. The second row may have "3) The patron enters the call number of each document to be checked out and clicks the 'Submit' button." on the left, and on the right "4) The system displays the document details for confirmation." The third row may have "5) The patron clicks the 'OK' button to confirm the checkout" and "6) The system updates the database and displays a confirmation message to patron."

With regard to object interaction modeling, AST 50 may help the engineer to specify how the software objects interact with each other to carry out background processing of the use cases. In one embodiment, AST 50 uses the following steps to guide the engineer in that process.

Object Interaction Modeling (OIM) Step 1. Identifying Background Processing Steps.

In this step, the right column of each expanded use case is examined to identify steps that require background processing.

OIM Step 2. Writing a Scenario for Each Background Processing Step.

In this step, the engineer creates a scenario that describes how software objects interact with each other to carry out each background process step. AST 50 provides that each sentence of the scenario description should be a declarative sentence consisting of a subject, a subject action, an object acted upon, and optionally other objects or data required by the subject action. The scenario may contain loop statements or conditional statements.

OIM Step 3. Converting Scenario Descriptions to Scenario Tables.

In this step, each scenario is converted into a five column table, called a scenario table. The columns show the line number, subject, subject action, other objects or data required by the subject action, and the object acted upon. This step is optional but recommended because it facilitates the conversion of scenarios to UML sequence diagrams.

OIM Step 4. Visualizing the Scenarios.

In this step, AST 50 uses a set of rules or instructions to help the engineer to convert the scenario tables into UML sequence diagrams. The following sections detail these steps.

4.1 Identifying Background Processing Steps

AST 50 instructs the engineer to examine each two-column actor-system interaction table and identify right-column steps that require background processing. AST 50 instructs the engineer expand each such step further with a description of a scenario. The scenario should describe how software objects interact to carry out the background processing. As an example, steps 4) and 6) in the expanded use case described above require background processing because 4) needs a database read to retrieve document information and 6) needs to update the database.

4.2 Writing Background Processing Scenarios

In this step, AST 50 instructs the engineer to write a scenario to describe how software objects interact with each other to carry out each of the background processing steps. AST 50 ensures that each statement of the scenario is a declarative sentence and consists of a subject, a subject action, an object that is acted upon, and optionally other objects or data that are required by the subject action. Each scenario begins with the actor input and/or actor action specified in the left column of the background processing step. It ends when the required information is produced. A scenario may contain loop statements and conditional statements. The following listing presents some sample scenario statements for step 4) from the expanded use case described above. (The line numbers are not needed here, but are shown to illustrate a one-to-one correspondence in the conversion from scenario description to scenario table, and from scenario table to sequence diagram.)

| | |
|---|---|
| 3) | The patron enters the call number of each document to be checked out and clicks the "Submit" button. |
| 4) | The checkout graphical user interface (GUI) sends the call numbers to the checkout controller |
| 4.1) | The checkout controller creates a return message (denoted msg) |
| 4.2) | For each call number submitted |
| 4.2.1) | The checkout controller gets the document from the database manager using the call number |
| 4.2.2) | The database manager returns the document d to the checkout controller |
| 4.2.3) | If the document exist (i.e., d is not null) then |
| 4.2.3.1) | The checkout controller checks the availability with the document d |
| 4.2.3.2) | If the document is available (i.e., d.isAvailable( ) is true) then |
| 4.2.3.2.1) | The checkout controller appends document detail to msg |
| 4.2.3.3) | else |
| 4.2.3.3.1) | The checkout controller appends call number "not available" to msg |
| 4.2.4) | else |
| 4.2.4.1) | The checkout controller appends call number "not found" to msg |
| 4.3) | The checkout controller returns msg to the checkout GUI |
| 4.4) | The checkout GUI displays the document details to the patron |

This technique could be applied to model an existing manual processing system (e.g., a manually operated library system) in a similar way—simply replace "software object(s)" with the appropriate real-world entities such as librarian, book, etc.

4.3 Constructing Scenario Tables

Next, the scenario descriptions are converted into scenario tables, each of which is a five column table with the columns labeled by line number, subject, subject action, optional objects or data, and object acted, respectively.

FIG. 9 is an example scenario table. In one embodiment, AST 50 guides the engineer in converting the four components of each statement of the scenario description into the last four columns of the scenario table. The conversion should not be difficult, as shown by the one-to-one correspondence of the line numbers in the scenario description above and the scenario table of FIG. 9. (The indention in column 2 is optional, to improve readability.)

4.4 Converting Scenario Table to UML Sequence Diagram

In this step, the scenario tables are converted into informal UML sequence diagrams.

4.5 From Informal to Formal Sequence Diagram

The last step of object interaction modeling is converting the informally specified sequence diagram into a formally specified sequence diagram. In other words, the English (or other human language) texts are converted into program-language-like statements. The way scenarios are specified makes this conversion relatively easy.

After the formal sequence diagrams have been created, a design class diagram may be derived from the sequence diagrams and the domain model.

By using the development tools described, a software engineer may produce better domain models, compared to the domain models produced with convention development tools. In addition, the software engineer need not manually translate the domain model into a domain diagram, but may instead use the development tools to generate the domain diagram automatically.

In light of the principles and example embodiments described and illustrated herein, it will be recognized that the example embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. Similarly, regarding any benefits and/or advantages described herein, different embodiments may provide some, all, or different benefits or advantages.

Also, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. An automated method for generating a domain model for an object-oriented software application, the method comprising:

providing a user at a data processing system with a user interface having features to guide the user through a process of (a) selecting phrases to represent particular domain-specific concepts for a domain of an object-oriented software application and (b) classifying the selected phrases according to respective object-oriented modeling concepts;

presenting a business description document in the user interface;

after presenting the business description document in the user interface, receiving user input selecting phrases from the business description document as representative of corresponding domain-specific concepts for the object-oriented software application;

receiving, at the data processing system, user input identifying a phrase among the selected phrases;

after receiving the user input identifying the phrase, presenting a predetermined list of characteristics in the user interface, wherein different characteristics among the list of characteristics correspond to different object-oriented modeling concepts;

after presenting the predetermined list of characteristics in the user interface, receiving user input selecting a characteristic for the identified phrase from the predetermined list of characteristics; and in response to the user input selecting the characteristic for the identified phrase, storing data in the data processing system to classify the selected phrase as pertaining to an object-oriented modeling concept that corresponds to the selected characteristic;

wherein the different object-oriented modeling concepts comprise at least three modeling concepts from the group consisting of classes, attributes, inheritance, aggregation, and association relationships.

2. A method according to claim 1, further comprising:

receiving user input selecting characteristics for additional phrases and, in response, storing data to classify the additional phrases as pertaining to object-oriented modeling concepts that correspond to the selected characteristics;

receiving user input requesting a Unified Modeling Language (UML) class diagram; and in response to the user input requesting the UML class diagram, automatically generating the UML class diagram, based at least in part on the data classifying the selected phrases as pertaining to corresponding object-oriented modeling concepts.

3. A method according to claim 1, wherein:

the predetermined list of characteristics comprises a list of options for categorizing the identified phrase according to grammatical characteristics of the phrase;

the data processing system comprises mapping rules to map grammatical characteristics to corresponding object-oriented modeling concepts; and the data processing system uses the mapping rules to associate the selected phrase with the corresponding object-oriented modeling concept.

4. A method according to claim 1, wherein:

the predetermined list of characteristics comprises a list of options for categorizing the identified phrase according to grammatical characteristics of the phrase; and the list of options for categorizing the identified phrase according to grammatical characteristics of the phrase comprises at least four options from the group consisting of:
an option to categorize the identified phrase as a noun;
an option to categorize the identified phrase as an expression of the form "X of Y";
an option to categorize the identified phrase as a transitive verb;
an option to categorize the identified phrase as an adjective;
an option to categorize the identified phrase as a numeric value;
an option to categorize the identified phrase as an expression of possession;
an option to categorize the identified phrase as expressing a constituent part relationship;
an option to categorize the identified phrase as expressing a containment relationship;
an option to categorize the identified phrase as describing a relationship of specialization; and
an option to categorize the identified phrase as describing a relationship of generalization.

5. A method according to claim 1, wherein the features to guide the user comprise:
a pane to display the business description document;
a mechanism to allow the user to select phrases from the business description document to represent particular domain-specific concepts for the domain of the object-oriented software application; and
a mechanism to indicate, in the user interface, which phrases in the business description document have already been selected to represent domain-specific concepts for the domain of the object-oriented software application.

6. A method according to claim 5, wherein the features to guide the user further comprise:
a pane to display a list of object-oriented modeling concepts that have been identified for the business description document.

7. A method according to claim 1, wherein the selected phrase comprises a sequence of one or more words.

8. An apparatus to facilitate creation of domain models for object-oriented software applications, the apparatus comprising:
a tangible, non-transitory, machine-readable medium; and
instructions in the machine-readable medium which, when executed by a data processing machine, enable the data processing machine to perform operations comprising:
providing a user at the data processing machine with a user interface having features to guide the user through a process of (a) selecting phrases to represent particular domain-specific concepts for a domain of an object-oriented software application and (b) classifying the selected phrases according to respective object-oriented modeling concepts;
presenting a business description document in the user interface;
after presenting the business description document in the user interface, receiving user input selecting phrases from the business description document as representative of corresponding domain-specific concepts for the object-oriented software application;
receiving user input identifying a phrase among the selected phrases;
after receiving the user input identifying the phrase, presenting a predetermined list of characteristics in the user interface, wherein different characteristics among the list of characteristics correspond to different object-oriented modeling concepts;
after presenting the predetermined list of characteristics in the user interface, receiving user input selecting a characteristic for the identified phrase from the predetermined list of characteristics; and
in response to the user input selecting the characteristic for the identified phrase, storing data in the data processing machine to classify the selected phrase as pertaining to an object-oriented modeling concept that corresponds to the selected characteristic;
wherein the different object-oriented modeling concepts comprise at least three modeling concepts from the group consisting of classes, attributes, inheritance, aggregation, and association relationships.

9. An apparatus according to claim 8, wherein the operations further comprise:
receiving user input selecting characteristics for additional phrases and, in response, storing data to classify the additional phrases as pertaining to object-oriented modeling concepts that correspond to the selected characteristics;
receiving user input requesting a Unified Modeling Language (UML) class diagram; and
in response to the user input requesting the UML class diagram, automatically generating the UML class diagram, based at least in part on the data classifying the selected phrases as pertaining to corresponding object-oriented modeling concepts.

10. An apparatus according to claim 8, wherein:
the predetermined list of characteristics comprises a list of options for categorizing the identified phrase according to grammatical characteristics of the phrase;
the machine-readable medium comprises mapping rules to map grammatical characteristics to corresponding object-oriented modeling concepts; and
the operations comprises using the mapping rules to associate the selected phrase with the corresponding object-oriented modeling concept.

11. An apparatus according to claim 8, wherein:
the predetermined list of characteristics comprises a list of options for categorizing the identified phrase according to grammatical characteristics of the phrase; and
the list of options for categorizing the identified phrase according to grammatical characteristics of the phrase comprises at least four options from the group consisting of:
an option to categorize the identified phrase as a noun;
an option to categorize the identified phrase as an expression of the form "X of Y";
an option to categorize the identified phrase as a transitive verb;
an option to categorize the identified phrase as an adjective;
an option to categorize the identified phrase as a numeric value;
an option to categorize the identified phrase as an expression of possession;
an option to categorize the identified phrase as expressing a constituent part relationship;
an option to categorize the identified phrase as expressing a containment relationship;
an option to categorize the identified phrase as describing a relationship of generalization; and
an option to categorize the identified phrase as describing a relationship of specialization.

12. An apparatus according to claim 11, wherein the list of options for categorizing the identified phrase according to grammatical characteristics of the phrase comprises at least five options from the group consisting of:
- an option to categorize the identified phrase as a noun for an object having independent existence in the domain;
- an option to categorize the identified phrase as a noun for a role played by an object in the domain;
- an option to categorize the identified phrase as a noun that describes an association between objects in the domain;
- an option to categorize the identified phrase as a noun for an object that does not exist independently in the domain;
- an option to categorize the identified phrase as an expression of the form "X of Y", where X exists independently in the domain;
- an option to categorize the identified phrase as an expression of the form "X of Y", where X does not exist independently in the domain;
- an option to categorize the identified phrase as an expression of the form "X of Y", where X denotes a role played by an object in the domain;
- an option to categorize the identified phrase as a transitive verb;
- an option to categorize the identified phrase as an adjective;
- an option to categorize the identified phrase as a numeric value pertaining to an object in the domain;
- an option to categorize the identified phrase as a numeric value pertaining to an attribute of an object in the domain;
- an option to categorize the identified phrase as an expression of possession for an object, where the possessed object has independent existence in the domain;
- an option to categorize the identified phrase as an expression of possession for an object, where the possessed object lacks independent existence in the domain;
- an option to categorize the identified phrase as expressing a constituent part relationship;
- an option to categorize the identified phrase as expressing a containment relationship involving a contained object and a containing object, where the contained object can be removed without affecting integrity of the containing object;
- an option to categorize the identified phrase as expressing a containment relationship involving a contained object and a containing object, where the contained object cannot be removed without affecting integrity of the containing object;
- an option to categorize the identified phrase as describing a relationship of generalization; and
- an option to categorize the identified phrase as describing a relationship of specialization.

13. An apparatus according to claim 8, wherein the features to guide the user comprise:
- a pane to display the business description document;
- a mechanism to allow the user to select phrases from the business description document to represent particular domain-specific concepts for the domain of the object-oriented software application; and
- a mechanism to indicate, in the user interface, which phrases in the business description document have already been selected to represent domain-specific concepts for the domain of the object-oriented software application.

14. An apparatus according to claim 13, wherein the features to guide the user further comprise:
- a pane to display a list of object-oriented modeling concepts that have been identified for the business description document.

15. A data processing machine to facilitate creation of domain models for object-oriented software applications, the data processing machine comprising:
- a processor;
- a tangible, non-transitory, machine-readable medium responsive to the processor; and
- instructions in the machine-readable medium which, when executed by the data processing machine, enable the data processing machine to perform operations comprising:
  - providing a user at the data processing machine with a user interface having features to guide the user through a process of (a) selecting phrases to represent particular domain-specific concepts for a domain of an object-oriented software application and (b) classifying the selected phrases according to respective object-oriented modeling concepts;
  - presenting a business description document in the user interface;
  - after presenting the business description document in the user interface, receiving user input selecting phrases from the business description document as representative of corresponding domain-specific concepts for the object-oriented software application;
  - receiving user input identifying a phrase among the selected phrases;
  - after receiving the user input identifying the phrase, presenting a predetermined list of characteristics in the user interface, wherein different characteristics among the list of characteristics correspond to different object-oriented modeling concepts;
  - after presenting the predetermined list of characteristics in the user interface, receiving user input selecting a characteristic for the identified phrase from the predetermined list of characteristics; and
  - in response to the user input selecting the characteristic for the identified phrase, storing data in the data processing machine to classify the selected phrase as pertaining to an object-oriented modeling concept that corresponds to the selected characteristic;
- wherein the different object-oriented modeling concepts comprise at least three modeling concepts from the group consisting of classes, attributes, inheritance, aggregation, and association relationships.

16. A data processing machine according to claim 15, wherein the operations further comprise:
- receiving user input selecting characteristics for additional phrases and, in response, storing data to classify the additional phrases as pertaining to object-oriented modeling concepts that correspond to the selected characteristics;
- receiving user input requesting a Unified Modeling Language (UML) class diagram; and
- in response to the user input requesting the UML class diagram, automatically generating the UML class diagram, based at least in part on the data classifying the selected phrases as pertaining to corresponding object-oriented modeling concepts.

17. A data processing machine according to claim 15, wherein:
- the predetermined list of characteristics comprises a list of options for categorizing the identified phrase according to grammatical characteristics of the phrase;

the machine-readable medium comprises mapping rules to map grammatical characteristics to corresponding object-oriented modeling concepts; and the operations comprises using the mapping rules to associate the selected phrase with the corresponding object-oriented modeling concept.

18. A data processing machine according to claim 15, wherein:

the predetermined list of characteristics comprises a list of options for categorizing the identified phrase according to grammatical characteristics of the phrase; and the list of options for categorizing the identified phrase according to grammatical characteristics of the phrase comprises at least four options from the group consisting of:

an option to categorize the identified phrase as a noun;

an option to categorize the identified phrase as an expression of the form "X of Y";

an option to categorize the identified phrase as a transitive verb;

an option to categorize the identified phrase as an adjective;

an option to categorize the identified phrase as a numeric value;

an option to categorize the identified phrase as an expression of possession;

an option to categorize the identified phrase as expressing a constituent part relationship;

an option to categorize the identified phrase as expressing a containment relationship;

an option to categorize the identified phrase as describing a relationship of generalization; and an option to categorize the identified phrase as describing a relationship of specialization.

19. A data processing machine according to claim 15, wherein the features to guide the user comprise:

a pane to display the business description document;

a mechanism to allow the user to select phrases from the business description document to represent particular domain-specific concepts for the domain of the object-oriented software application; and a mechanism to indicate, in the user interface, which phrases in the business description document have already been selected to represent domain-specific concepts for the domain of the object-oriented software application.

20. A data processing machine according to claim 19, wherein the features to guide the user further comprise:

a pane to display a list of object-oriented modeling concepts that have been identified for the business description document.

* * * * *